Figure 1:
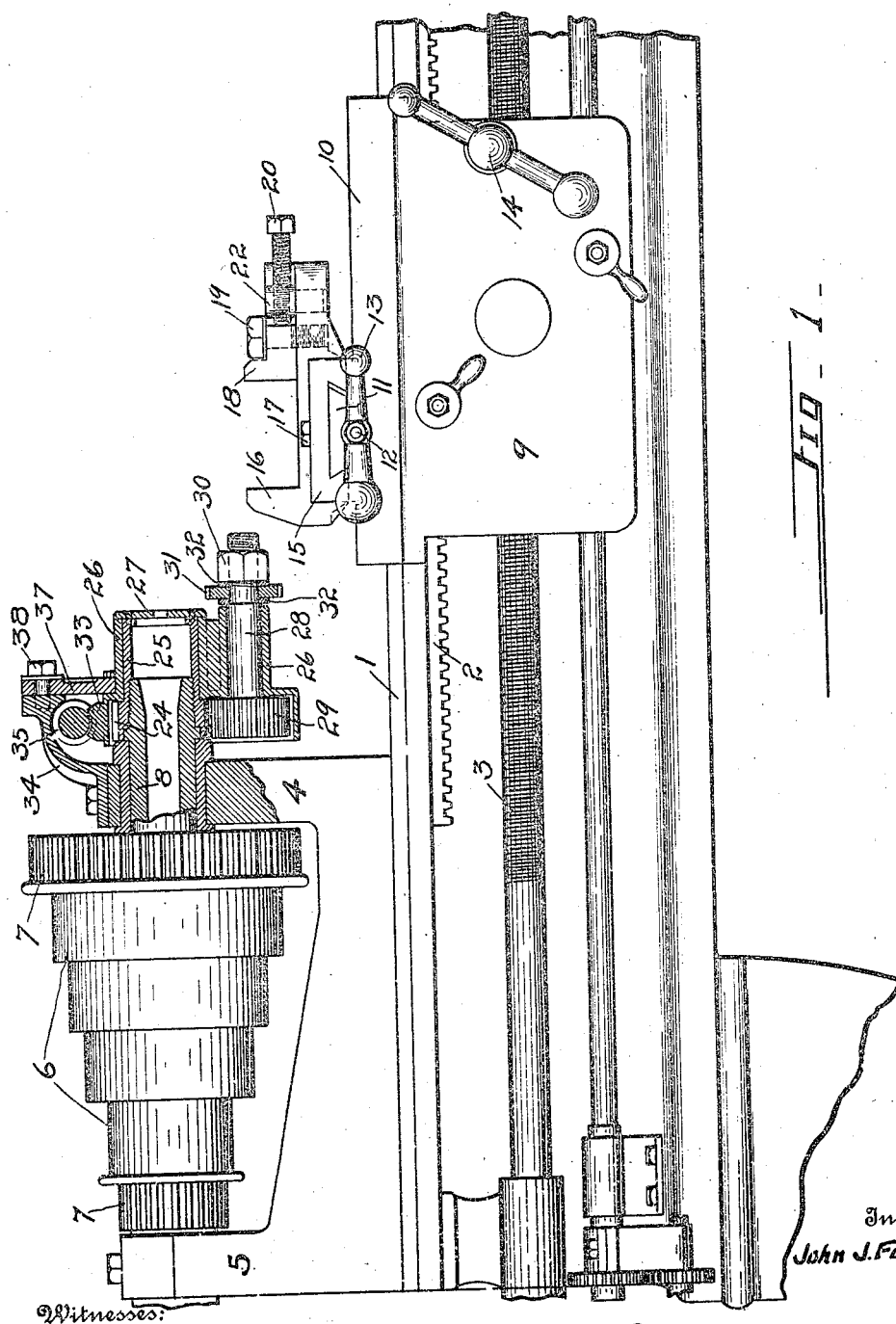

J. J. FUCHS, Jr.
MILLING ATTACHMENT FOR LATHES.
APPLICATION FILED JULY 23, 1912.

1,053,090.

Patented Feb. 11, 1913.
2 SHEETS—SHEET 1.

Witnesses:
A. R. Mitchell
W. A. Budd

Inventor,
John J. Fuchs, Jr.
By David O. Barnell,
Attorney.

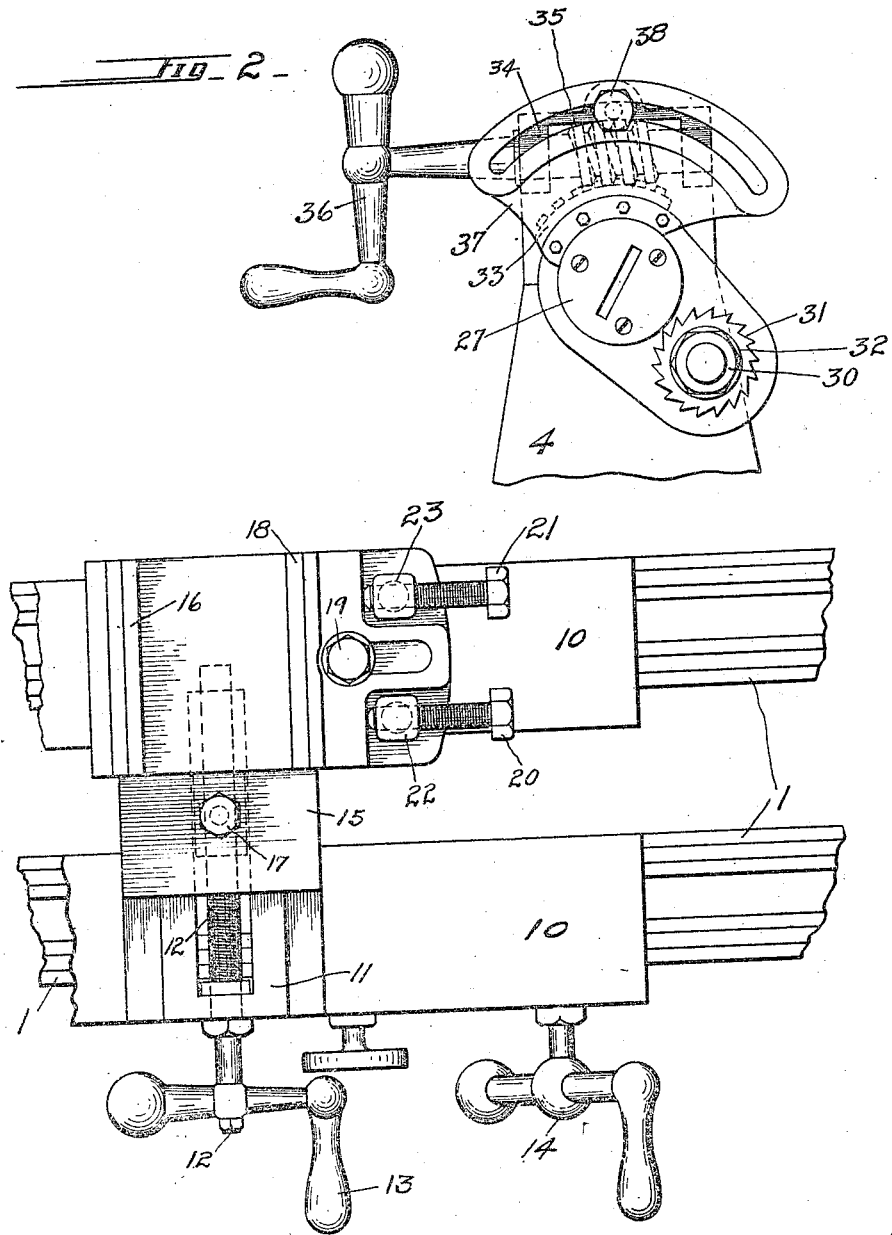

UNITED STATES PATENT OFFICE.

JOHN J. FUCHS, JR., OF BENSON, NEBRASKA.

MILLING ATTACHMENT FOR LATHES.

1,053,090.  Specification of Letters Patent.  Patented Feb. 11, 1913.

Application filed July 23, 1912. Serial No. 711,163.

*To all whom it may concern:*

Be it known that I, JOHN J. FUCHS, Jr., a citizen of the United States, and a resident of Benson, in the county of Douglas and State of Nebraska, have invented certain new and useful Improvements in Milling Attachments for Lathes, of which the following is a specification.

My invention relates to metal-working, and more particularly to lathes and milling machines.

It is the object of my invention to provide an attachment which may be used on the ordinary forms of metal-working or engine lathes, to enable the common milling operations, such as the keyseating of shafts, to be performed thereon.

Further objects of my invention are to provide means for holding the work so that the same may be moved in two directions in a horizontal plane, and means for moving the milling cutter toward and away from the work.

Constructions embodying my invention are illustrated in the accompanying drawings, in which—

Figure 1 is a partial front elevation of a lathe having my attachment applied thereto, parts of the attached devices being shown in vertical section, Fig. 2 is an end elevation of the milling device connected with the headstock and headstock spindle, and Fig. 3 is a plan view of the chuck or work-holder connected with the carriage of the lathe.

The parts of the lathe represented in the drawings are all of the ordinary construction and arrangement and comprise the following: The lathe-bed 1; feed-rack 2; lead-screw 3; the headstock having the bearing-standards 4 and 5, drive-pulleys 6, back-gears 7 and spindle 8; and the carriage having the apron 9, saddle 10, cross-feed rail 11, cross-feed screw 12, the handle 13 for turning the cross-feed screw, and the handle 14 for traversing or moving the carriage longitudinally of the lathe-bed.

For holding the work to be milled I provide a vise or chuck having a member 15 with a dove-tail channel in the lower side thereof adapted to fit slidably on the cross-feed rail 11, and a jaw 16 integral therewith and extending upwardly to form one side of the work holder. The member 15 is connected by means of a screw 17 with the nut on the cross-feed screw 12 and lying in the central slot in the cross-feed rail. By turning the handle 13 the said nut and the member 15 are moved transversely to the lathe-bed in the same manner as the usual cross-feed slide upon which the tool-post is carried when the lathe is used for ordinary work. The movable jaw-member 18 rests upon the flat upper surface of the member 15 and is held thereon by means of a screw 19 which passes through a slot therein as shown in Fig. 3. The jaw-member 18 is moved toward the fixed jaw by means of the screws 20 and 21 which pass through blocks 22 and 23, said blocks being pivotally connected with the member 15 so as to be swingable on vertical axes. By advancing one of the said screws more than the other the jaw-member 18 may be swung about the axis of the screw 19 so that an irregular or wedge-shaped piece of work may be held between the jaws 16 and 18. When the jaw-member 18 is swung the blocks 22 and 23 turn to positions such that the screws extend perpendicularly to the face of the jaw-member engaged by them.

It will be obvious that by the described devices the work held by the chuck may be moved longitudinally of the lathe-bed by traversing the carriage in the usual way, and may be moved transversely to the lathe-bed by turning the handle 13 and cross-feed screw 12 as is done in feeding the tool in to the work in ordinary turning operations on a lathe.

Upon the end of the spindle 8, which is regularly threaded to receive a chuck or face-plate, there is screwed a gear 24 having an elongated hollow hub 25. Swingably mounted upon the hub 25 is a casing 26 which is normally held against movement longitudinally of the hub by means of a plate 27 which is secured upon the end of the hub by means of small screws, as shown. In the plate 27 is a rectangular slot in which a bar may be inserted for the purpose of screwing the gear off and onto the spindle 8.

The milling-spindle 28 is revolubly mounted in the casing 26 so that its axis is parallel to the axis of the spindle 8 and gear 24. On the inner end of the spindle 28 is a gear 29 which meshes with the gear 24. The outer end portion of the spindle has a shoulder formed thereon, is threaded, and has a nut 30 on the threaded portion, so that a suitable milling-cutter 31 and spacing washers or sleeves 32 may be clamped thereon between the shoulder and the nut, as shown in Fig. 1. On the upper part of the casing 26 is formed a worm-gear segment 33.

A bracket 34 is secured to the standard 4 which carries the end-bearing for the spindle 8, said bracket preferably being secured to the standard by the same screws that are employed to hold the bearing-cap. In the bracket is revolubly mounted a transversely extending shaft, on the central part of which is formed a worm 35 which meshes with the worm-gear segment 33. On the front end of the shaft is a handle 36 which may be turned to revolve the worm and rotate the casing 26 about the axis of the spindle 8. A plate 37 having an arcuate slot therein is secured to the casing 26 and extends upwardly therefrom, adjoining the outer face of the bracket 34. A screw 38 passes through said slot into the bracket and may be employed to clamp the plate against the bracket and thus hold the casing 26 in a fixed relation to the headstock. It will be obvious that when the screw 38 is loosened and the casing 26 swung about the axis of the spindle 8, the milling-spindle 28 and cutter 31 will be raised and lowered relatively to the work held by the chuck or work-holder on the lathe carriage.

At the beginning of the milling operation the cutter may be fed down into the work by turning the handle 36, and after the cutter has reached the proper depth the screw 38 may be tightened to hold the cutter securely at the proper elevation. The cross-feed screw may then be turned by means of the handle 13 so as to move the chuck and the work held thereby transversely to the lathe-bed. Ordinarily the carriage would be traversed, or moved longitudinally of the lathe-bed, only for the purpose of bringing the work and the milling-cutter into proper alinement, but said movement of the carriage might be used for feeding the work to the cutter in the event that there was employed an end-mill or one adapted to cut at the end or side-face thereof instead of at the peripheral face only.

Now, having described my invention, what I claim and desire to secure by Letters Patent is:

1. In a lathe, the combination with a carriage, a work-holder carried thereby, a headstock, and a spindle revoluble therein, of a revoluble milling spindle, driving means for connecting the same with the headstock spindle, means for adjusting the milling spindle concentrically about the axis of the headstock spindle, and means for retaining the milling spindle in adjusted relation to the head-stock.

2. The combination with a work-holder adapted to be mounted on a lathe carriage, and a headstock having a revoluble spindle, of a casing pivotally mounted concentrically with the headstock spindle, a milling spindle revoluble in said casing and actuated by the headstock spindle, means for moving the casing about the axis of the headstock spindle, and means for retaining the casing in adjusted relation to the headstock.

3. The combination with a lathe headstock and spindle, of a casing mounted to swing concentrically about the axis of the lathe spindle, a milling spindle revoluble in said casing, driving means connecting said spindle and the lathe spindle, and means for adjusting said casing about the axis of the lathe spindle.

4. The combination with a lathe headstock and spindle, of a casing mounted to swing about the axis of the lathe spindle, a milling spindle revoluble in said casing, gearing operatively connecting said spindles, a worm-gear segment on the casing, a shaft revolubly mounted on the headstock, and a worm on said shaft engaging the worm-gear segment for moving the casing transversely to the axis of the lathe spindle.

5. In a milling attachment for lathes, the combination with a headstock having a spindle revolubly mounted therein, and a work-holder movable in a horizontal plane longitudinally of and transversely to the headstock spindle, of a milling spindle mounted adjacent to the headstock spindle, driving means connecting said spindles, and means for adjusting the milling spindle vertically to move the same toward and away from the work-holder.

6. In a lathe, the combination with a longitudinally movable carriage having a cross-feed screw, and a headstock having a revoluble spindle, of a work-holder mounted on the carriage and connected with the cross-feed screw so as to be movable transversely thereby, a gear removably connected with the headstock spindle, a casing mounted on said gear, a milling spindle revolubly mounted in the casing and actuatable by said gear, and means for moving the casing about the axis of the gear to vary the vertical relation of the milling spindle to the work-holder.

In testimony whereof I have hereunto subscribed my name in the presence of two witnesses.

JOHN J. FUCHS, Jr.

Witnesses:
 A. R. MITCHELL,
 D. O. BARNELL.